United States Patent [19]
Webster

[11] 3,831,105
[45] Aug. 20, 1974

[54] CYANINE DYE INFRARED LASERS

[75] Inventor: Frank G. Webster, Rochester, N.Y.

[73] Assignee: Eastman Kodak Company, Rochester, N.Y.

[22] Filed: Oct. 6, 1972

[21] Appl. No.: 295,774

[52] U.S. Cl........ 331/94.5 L, 252/301.2, 260/240.1
[51] Int. Cl........................... H01s 3/20, C09b 23/00
[58] Field of Search............... 260/240.1; 252/301.2; 331/94.5

[56] References Cited
OTHER PUBLICATIONS
Snavely, SPIE Journal, Vol. 8, May 1970 pp. 119–125.

Primary Examiner—John D. Randolph
Assistant Examiner—C. M. S. Jaisle
Attorney, Agent, or Firm—Mr. D. M. DeLeo

[57] ABSTRACT

Cyanine dyes containing a benzopyrylium nucleus in the chromophoric chain are useful as laser dyes. These dyes are used in solution with a non-interfering solvent to form lasing media useful in dye lasers. When excited, these dyes typically emit in the near infrared region of the spectrum.

10 Claims, No Drawings

CYANINE DYE INFRARED LASERS

BACKGROUND OF INVENTION

1. Field of Invention

This invention relates to lasers and more particularly to the use of a certain class of dyes as lasing media for organic dye lasers.

2. Description of the Prior Art

Many of the materials discovered thus far which are capable of acting as lasing media have been in the solid or gaseous state. Solid lasers typically suffer from such disadvantages as cracking and optical imperfections. It is also known that certain organic dyes in solution can operate as "liquid" or "organic dye" lasers. Of the range of materials useful as lasing media, organic lasing dyes provide certain advantages. A wide range of organic dye lasers is available to provide stimulated emission (lasing) over a broad range of the spectrum. Secondly, organic dye lasers are generally capable of being tuned to emit over a range of wavelengths, this being in contradistinction to the essentially single wavelength capability of lasing emission characterizing gas and solid lasers. Thirdly organic dye lasers provide an economical lasing medium when compared to gas and solid lasers, and they do not suffer from disadvantages such as cracking and optical imperfections that are particularly associated with solid lasers.

The ability to selectively tune organic dye lasers derives from the broad band fluorescence characteristic of the component dye. Such lasers can be "tuned" to emit at wavelengths along substantially the entire fluorescence band of the dye by interposing a dispersive element such as a diffraction grating or a prism.

The operation of a laser is achieved as a result of the phenomenon that excited atoms or molecules can emit a photon or quantum of light, which photon or quantum can itself trigger another excited atom or molecule to emit its photon prematurely. This process is designated stimulated emission.

The excitation of organic lasing dyes can be achieved by subjecting the dye, under controlled conditions such as will be described herein, to a suitable source of energy such as bombarding it with electrons or illuminating it with a high energy source. Conventionally, illumination is utilized for liquid laser materials. Excitation of a liquid laser medium by illumination is generally termed "optical pumping" or merely "pumping." Pumping sources include, for example, sources such as giant pulse lasers, xenon and argon arc flash tubes as well as arc discharge tubes containing only air or other gaseous mixtures.

Various arrangements of laser apparatus can be used. A laser structure particularly adapted for organic dye liquid laser media is described by Sorokin et al., IBM Journal, V. 11, p. 148 (1967). Advantageous laser apparatus structures usually include an optically resonant cavity containing a reservoir of a liquid laser medium or a liquid laser body disposed within a thin-walled quartz cylinder. Typically, the reservoir is part of a closed system through which the dye solution is circulated during lasing operation. Thus, localized heating which can cause refractive discontinuities and potential breakdown of the dye is effectively prevented. To provide an energy source for exciting the atoms of the laser material, the laser body can be surrounded concentrically by a lamp, such as one containing an annular region within an outer thick-walled quartz cylinder. The annular region can contain an air-argon mixture and have electrodes which are operably connected to a low inductance capacitor charged by a standard high voltage supply. Desirably, coaxially disposed at either end of the optically resonant cavity are opposed internally reflective cavity ends such as mirrors.

When optical pumping is used, the light source emits light having wavelengths within at least one absorption band of the lasing medium. The absorbed light causes molecular electrons in the medium to shift in energy level. Molecular electrons exist either in a single state (two electrons spinning in opposite directions) or a triplet state (two electrons spinning in the same direction). The ground state is the unexcited state for molecular electrons and has the lowest energy. Typically, the ground state in almost all molecules is a singlet (designated $S^0$), one of many possible energy levels in the singlet state. When the pumping source is activated, the resultant light pulse enters the laser body and photons of energy of appropriate absorptive wavelength are absorbed by active molecules in the body and cause the electrons of such molecules to shift from an initial low energy level ($S^0$) to a high energy level from which emissive transition occurs.

In operation, the molecular electrons of the laser medium are desirably "pumped" to higher excited states of the singlet system by intense energy inputs. It is thought that they then first undergo transitions from such excited states to the lowest excited state (designated $S^1$). After diminishing in energy level to the lowest excited singlet, the molecule can relinquish its remaining excess energy radiatively or non-radiatively from $S^1$ to $S^0$, non-radiatively from $S^1$ to a triplet state and then radiatively or non-radiatively from the lowest excited triplet state to $S^0$. Generally, laser emission consists of optical emission resulting from transitions from $S^1$ to various vibrational modes of $S^0$. Susceptibility to triplet formation upon pumping is deleterious due to typical non-radiative energy losses resulting from triplet to $S^0$ transitions. Also, if there is significant overlap between the triplet absorption and either the pump bands or lasing emission bands, laser action generally will be impeded or will fail entirely. Additionally, advantageous laser emission can occur only when the population of molecules established at this higher energy level in the laser body by such light pumping exceeds the population of molecules remaining at the initial low energy level, a condition conventionally designated "population inversion" or "inversion of energy states."

Upon reaching an inversion of energy states, individual molecules of the high energy level population undergo emissive transition spontaneously, shifting to a terminal low energy level as described herein with a concomitant emission of light. A portion of the spontaneously emitted light is usually reflected back and forth through a resonant optical cavity structure, such as previously described, between its internally reflective ends. As this light passes through the laser body in multiple bidirectional reflections, it induces other molecules of the enlarged high energy level population to undergo premature light emissive transitions as noted herein. This produces more light, which augments the bidirectionally reflected light in the cavity to induce still further light emissive transitions. A rising pulse of bidirectionally reflected light quickly develops in the cavity, reaching a quantitatively large value as the induced emissive transition of molecules from the high energy level population increases. If one of the reflective cavity ends is partially transmissive, as is typically the case, a portion of the intense reflected light pulse passes through the one and out of the cavity to constitute the laser output light pulse of the laser beam.

Organic dye lasers have been devised for use in a variety of applications. By selecting the appropriate dye and solvent, a wavelength of lasing can be obtained in virtually any portion of the visible spectrum. However, there has been a near complete lack of success in obtaining dye laser emission in the near infrared portion of the spectrum. Accordingly, there is a need in the art for a class of dyes which lase in and around the near infrared region of the spectrum.

SUMMARY OF THE INVENTION

I have found that a class of cyanine dyes containing a benzopyrylium nucleus in the chromophoric chain are useful as lasing media. This class of dyes includes various individual dyes which, when suitably excited, lase in the near infrared region of the spectrum. Minor modifications of the structures of these dyes allow one to prepare lasing composition which will emit at selected wavelengths in and around the near infrared region of the spectrum.

DESCRIPTION OF PREFERRED EMBODIMENTS

The objects of the present invention are obtained through the use, with dye lasers having a reservoir means containing a laser dye solution and a pumping energy source capable of producing stimulated emission of the solution which comprises a lasing concentration of dye in a non-interfering solid or liquid host solvent (i.e., one that does not inhibit stimulated emission), of a cyanine dye containing a benzopyrylium nucleus in the chromophoric chain.

The dyes useful in this invention can be represented by the structural formula:

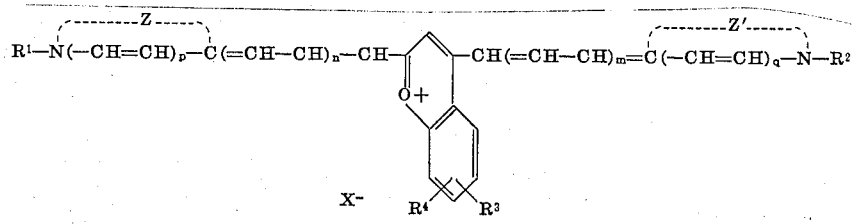

wherein $n$ and $m$ each represent an integer having a value of 0, 1 or 2 with the sum of $n$ and $m$ preferably not less than 1 or greater than 2;

$p$ and $q$ each represent an integer having a value of 0 or 1;

$R^1$ and $R^2$ each represent an alkyl radical having 1 to about 10 and preferably about one to about four carbon atoms and including substituted alkyl radicals having such substituents as sulfo, carboxy, dialkylamino (having one to about four carbon atoms in the alkyl moieties), hydroxy, alkoxy (having one to about four carbon atoms in the alkyl moiety), acyloxy, alkoxycarbonyl (having one to about four carbon atoms in the alkyl moiety) and an aryl radical; an alkenyl radical having two to about 10 and preferably two to about four carbon atoms and including substituted alkenyl radicals; a monocyclic aryl radical including substituted monocyclic aryl radicals, e.g., phenyl, including substituted phenyl such as halophenyl, (chloro, bromo, etc), alkyl phenyl (having one to about four carbon atoms in the alkyl moiety) alkoxyphenyl (having one to about four carbon atoms in the alkyl moiety), hydroxyphenyl, etc; and an ethylene or trimethylene radical attached to the moiety Z or Z', respectively, to form a 5- or 6-membered fused heterocyclic ring, e.g., as in a 3,4-trimethylenenaphtho[2,3-d]thiazolium nucleus of the structure:

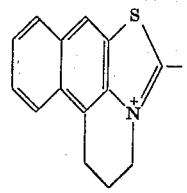

$R^3$ and $R^4$ when taken separately each represent a hydrogen atom, a lower alkyl radical typically having one to about four carbon atoms (e.g., methyl, ethyl, isopropyl, butyl, etc), a lower alkoxy radical typically having one to about four carbon atoms (e.g., methoxy, ethoxy, propoxy, butoxy, etc), a halogen atom (e.g., chlorine, iodine, etc), a hydroxy radical and the like and when taken together with the carbon atoms to which they are attached, $R^3$ and $R^4$ represent the carbon atoms necessary to complete a fused unsaturated carbocyclic ring which typically contains at least about six carbon atoms;

Z and Z' each represent the non-metallic atoms necessary to complete a heterocyclic nucleus containing from five to six atoms in the heterocyclic ring, such as those selected from the group consisting of a thiazole nucleus (e.g., thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, etc), a benzothiazole nucleus (e.g., benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dimethylenebenzothiazole, 5-hydroxybenzothiazole, 6-hydroxybenzothiazole, etc), a naphthothiazole nucleus (e.g., naphtho-[1,2-d]thiazole, naphtho[2,1-d]thiazole, naphtho[2,3-d]thiazole, 5-methoxynaphtho[2,1-d]thiazole, 5-ethoxynaphtho[2,1-d]thiazole, 8-methoxynaphtho[1,2-d]thiazole, 7-methoxynaphtho[1,2-d]thiazole, etc), a thianaphtheno-7',6',4,5-thiazole nucleus (e.g., 4'-methoxythianaphtheno-7',6',4,5-thiazole, etc), an oxazole nucleus (e.g., 4-methyloxazole, 5-methyloxazole, 4-phenyloxazole, 4,5-diphenyloxazole, 4-ethyloxazole, 4,5-dimethyloxazole, 5-phenyloxazole, etc), a benzoxazole nucleus (e.g., benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc), a naphthoxazole nucleus (e.g., naphtho[1,2-d]oxazole, naphtho[2,1-d]oxazole, naphtho[2,3-d]-oxazole, etc), a thiazoline nucleus (e.g., thiazoline, 4-methylthiazoline, etc), an imidazoquinoline nucleus (e.g., 1H-imidazo[4,5-b]quinoline, etc), a benz[e]indole nucleus (e.g., 1,1'-dimethylbenz[e]indole, etc), a benzimidazole nucleus (e.g., 1,3-diethylbenzimidazole, 1-ethyl-3-phenylbenzimidazole, etc), a naphthimidazole nucleus (e.g., 1H-naphth[2,3-d]imidazole, etc), a 3,3-dialkylindolenine nucleus (e.g., 3,3-dimethylindolenine, 3,3,5-trimethylindolenine, 3,3,7-trimethylindolenine, etc), a 2-pyridine nucleus (e.g., pyridine, 5-methylpyridine, etc), a 4-pyridine nucleus (e.g., pyridine, etc), an imidazo[4,5-b]-quinoxaline nucleus (e.g., 1,3-dialkylimidazo[4,5-b]quinoxaline such as 1,3-diethylimidazo[4,5-b]quinoxaline, 6-chloro-1,3-diethylimidazo[4,5-b]quinoxaline, etc, 1,3-dialkenylimidazo[4,5-b]quinoxaline such as 1,3-diallylimidazo[4,5-b]quinoxaline, 6-chloro-1,3-diallylimidazo[4,5-b]quinoxaline, etc, 1,3-diarylimidazo[4,5-b]quinoxaline such as 6,7-dichloro-1,3-diphenylimidazo[4,5-b]quinoxaline, 1,3-diphenylimidazo[4,5-b]quinoxaline, 6-chloro-1,3-diphenylimidazo[4,5-b]quinoxaline, 1,3-bis(p-chlorophenyl)imidazo[4,5-b]quinoxaline), etc; and $X^-$ represents an acid anion such as chloride, bromide, iodide, thiocyanate, perchlorate, p-toluenesulfonate, tetrafluoroborate, etc.

As used herein, the term "lasing concentration" refers to a concentration sufficient to promote, under appropriate conditions such as those mentioned herein, stimulated emission of the laser dye solution. Generally, concentrations of from about $10^{-1}$ to $10^{-6}$ molar are employed, with solutions of from about $10^{-2}$ to $10^{-5}$ molar concentrations being preferred for maximum output energies. Still wider variations in concentration can be used for particular operations, if desired.

Representative useful non-interfering solvents which do not inhibit stimulated emission are water; alkanols, including mono-, di- and polyhydric alcohols containing from one to about six carbon atoms and preferably from two to about four carbon atoms, e.g., methanol, ethanol, isopropanol, isopropanediol, butanol, etc; and aryl alcohols such as various benzene derivatives wherein the hydroxy radical is attached directly to the aryl nucleus or is attached thereto through an alkylene moiety having from one to about four carbon atoms, e.g., phenol, methylphenol, resorcinol, phenylcarbinol, methylphenylcarbinol, etc. Other solvents include fluorinated organic alcohols corresponding to the alcohols described above and discussed further in copending Drexhage application Ser. No. 149,055, filed June 1, 1971, and entitled LASER MEDIA CONTAINING FLUORINATED ALCOHOLS, now U.S. Pat. No. 3,736,524. Also useful are heterocyclic compounds having a nitrogen heteroatom (e.g., pyridine, 2,6-dimethylpyridine, etc), and lower alkyl ketones such as dimethylketone. Additional useful solvents include alkyl substituted solvents such as dimethylsulfoxide, dimethylacetamide, dimethylformamide and the like as well as deuterated counterparts of various solvents such as those described above. Of course, combinations of liquids can be used as can other solvents known to be useful in the dye laser art. For example, solid host solvents can be used to form solid solutions of the dye. Acrylic or methacrylic polymers such as polymethylmethacrylate are useful for this purpose. Gelatin is another useful vehicle for lasing dyes. See O. J. Peterson and B. B. Snavely, *App. Phys. Let.*, Vol. 12, p. 238, 1968; B. H. Soffer and B. B. McFarland, *App. Phys. Let.*, Vol. 12, 1967; H. Kogelnick et al, *App. Phys. Let.*, Vol. 16, p. 499, 1970.

A representative preparation of a dye of the present invention is given in the following example. It will be appreciated that other dyes of this invention can be prepared in a similar manner.

EXAMPLE 1

4-Methyl-2-thiocoumarin

A mixture of 8 g. (1 mol) of 4-methylcoumarin (see *Org. Syn.*, Vol. III, page 581) and 5.6 g. (½ mol) of phosphorus pentasulfide is refluxed in dry pyridine for 20 minutes. The reaction mixture is poured into warm water, the whole chilled and the solid collected on a filter. The crude material is dissolved in hot methanol, filtered, poured into water, chilled and filtered. The solid is treated twice more in a like manner; during the last treatment activated charcoal is added to the hot methanol before filtering. The yield of crystals is 46 percent (m.p. 65°–70°C).

4-[3-(3-ethyl-2(3H)-benzothiazolidene)propenyl]-2-thiocoumarin

A mixture of 5.28 grams (1 mol) of 4-methyl-2-thiocoumarin, 13.5 grams (1 mol) of 2-(2-acetanilidovinyl)-3-ethylbenzothiazolium iodide and 4.6 ml. (1 mol + 10 percent excess) of triethylamine are refluxed in 25 ml. of ethanol for 20 minutes. The reaction mixture is chilled and filtered. The crude dye is extracted three times with hot methanol. A second mixture of equal size is made except pyridine is used instead of ethanol. The two mixtures are combined and the crude dye is dissolved in hot pyridine, filtered hot and poured into methanol, chilled and collected on a filter. After another such treatment the yield of green needles with a gold reflux is 37 percent (m.p. 243°–244°C).

2-[(3-Ethyl-2(3H)-benzothiazolinylidene)methyl]-4-[3-(3-ethyl-2(3H)benzothiazolidene)propenyl]-5,6-benzopyrylium iodide A mixture of 1.0 g. (1 mol) of 4-[3-(3-ethyl-2(3H)-benzothiazolinylidene)propenol]-2-thiocoumarin and 1.0 g. (1 mol + 10 percent excess) of methyl-p-toluenesulfonate are heated until a purple melt is formed, the melt is cooled and washed with ether. To this residue is added 0.84 g. (1 mol) of 3-ethyl-2-methylbenzothiazolium iodide, 0.8 ml. (1 mol + 10 percent excess) of triethylamine and 25 ml. of dry pyridine. The resultant mixture is refluxed for 20 minutes, cooled and ether is added. The resulting liquors are decanted and the sticky residue is stirred in water and the water decanted. The residue is dissolved in ethanol, water is added and the solution is boiled until crystals form. After two recrystallizations from methanol, the yield of dark green crystals with a coppery reflux is 26 percent (m.p. 279°–280°C).

The following additional examples are included for a further understanding of the invention. Unless otherwise stated, the excitation source in the following examples is an electric arc discharge occurring in a quartz discharge tube, approximately 3 mm ID and 15 cm. long with the electrodes located at either end. Energy for the excitation source is stored by a Cornell Dubilier 1 μf fast discharge capacitor. The discharge is effected by applying an electric field between the two electrodes of about 1 kilovolt/cm and reducing the air pressure in the tube until spontaneous breakdown of the air occurs within the tube. The lasing media is contained in a dye cell which is another quartz tube about 3 mm ID and about 14 cm. in length having high optical quality windows sealing both ends. This dye cell is mounted adjacent and parallel the discharge tube. Both the cell and the discharge tube are optically coupled by virtue of their substantially axial location within a cylindrical diffuse reflecting cavity. The resultant resonant optical cavity is bounded by two plane mirrors separated approximately 40 cm. and aligned so that light reflected perpendicularly therefrom passes back along the longitudinal axis of the dye cell. The laser output which emerges from the resonant optical cavity is directed toward a spectrograph to measure the wavelength. Unless otherwise indicated, the dye is dissolved in dimethyl sulfoxide at a concentration of about $10^{-4}$ molar.

EXAMPLE 2

The following dyes are individually tested in the laser device described above. The dye (1) 2-[3-ethyl-2(3H)-benzothiazolylidene)methyl]-4-[3-(3-ethyl-2(3H)-benzothiazolylidene)propenyl]-5,6-benzopyrylium iodide lases at 850 nm and the dye (2) 4-[3-(3-ethyl-2(3H)-benzothiazolylidene)propenyl]-2-[(3-ethyl-2(3H)-benzoxazolylidene)methyl]-5,6-benzopyrylium iodide lases at 808 nm.

EXAMPLE 3

Example 2 is repeated using dye 1 in propanol. Lasing occurs but the wavelength was not measured.

EXAMPLE 4

Example 2 is repeated using dye 2 in completely deuterated dimethyl sulfoxide. Lasing occurs but the wavelength was not measured.

The invention has been described in detail with particular reference to certain preferred embodiments thereof, but it will be understood that variations and modifications can be effected within the spirit and scope of the invention.

I claim:

1. A dye laser comprising a laser dye solution, a pumping energy source operably coupled with said solution for producing a population inversion in said solution and means for producing stimulated emission of radiation from the dye solution, said dye solution comprising a non-interfering solvent containing a lasing concentration of a dye having a formula as follows:

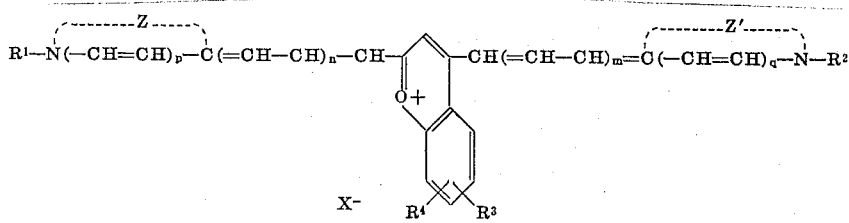

wherein:
- $n$ and $m$ each represent an integer having a value of 0, 1 or 2;
- $p$ and $q$ each represent an integer having a value of 0 or 1;
- $R^1$ and $R^2$ each represent a member selected from the group consisting of an alkyl radical having one to about 10 carbon atoms, an alkenyl radical having one to about 10 carbon atoms, a phenyl radical and an ethylene or trimethylene radical attached to the moiety Z or Z', respectively, to form a 5- or 6-membered fused heterocyclic ring;
- Z and Z' each represent the non-metallic atoms necessary to complete a heterocyclic nucleus selected from the group consisting of a thiazole nucleus, a benzothiazole nucleus, a naphthathiazole nucleus, an oxazole nucleus, a benzoxazole nucleus, a naphthoxazole nucleus, a thiazoline nucleus, an imidazoquinoline nucleus, a benz(e)indole nucleus, a benzimidazole nucleus, a naphthimidazole nucleus, a 3,3-dialkylindolenine nucleus, a 2-pyridine nucleus, a 4-pyridine nucleus and an imidazo(4,5-b)-quinoxaline nucleus;
- $R^3$ and $R^4$, when taken separately, each represent a member selected from the group consisting of a hydrogen atom, a lower alkyl radical having one to about four carbon atoms, a lower alkoxy radical having one to about four carbon atoms, a halogen atom and a hydroxy radical and, when taken together, $R^3$ and $R^4$ represent the carbon atoms necessary to complete a fused, 6-membered, unsaturated carbocyclic ring; and
- $X^-$ represents an acid anion.

2. The dye laser as described in claim 1 wherein said dye is present in a concentration of about $10^{-2}$ to $10^{-5}$ molar.

3. The dye laser as described in claim 1 wherein the sum of n and m is not less than 1 or greater than 2.

4. A method of producing coherent laser emission in the operation of a dye laser in the wavelength range of from about 700 nm to about 1μ comprising the steps of placing in an optically resonant cavity and optically pumping a dye solution to produce a population inversion in said solution with resulting stimulated emission, said solution comprising a non-interfering solvent containing between about $10^{-2}$ to about $10^{-5}$ molar concentration of a lasing dye having a formula as follows:

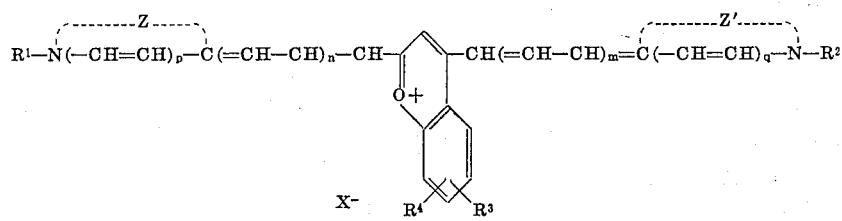

wherein:
n and m each represent an integer having a value of 0, 1 or 2;
p and q each represent an integer having a value of 0 or 1;
$R^1$ and $R^2$ each represent a member selected from the group consisting of an alkyl radical having one to about 10 carbon atoms, an alkenyl radical having two to about 10 carbon atoms, a phenyl radical and an ethylene or trimethylene radical attached to the moiety Z or Z', respectively, to form a 5- or 6-membered fused heterocyclic ring;
Z and Z' each represent the non-metallic atoms necessary to complete a heterocyclic nucleus selected from the group consisting of a thiazole nucleus, a benzothiazole nucleus, a naphthathiazole nucleus, an oxazole nucleus, a benzoxazole nucleus, a napththoxazole nucleus, a thiazoline nucleus, an imidazoquinoline nucleus, a benz(e)indole nucleus, a benzimidazole nucleus, a naphthimidazole nucleus, a 3,3-dialkylindolenine nucleus, a 2-pyridine nucleus, a 4-pyridine nucleus and an imidazo(4,5-b)-quinoxaline nucleus;
$R^3$ and $R^4$, when taken separately, each represent a member selected from the group consisting of a hydrogen atom, a lower alkyl radical having one to about four carbon atoms, a lower alkoxy radical having one to about four carbon atoms, a halogen atom and a hydroxy radical and, when taken together, $R^3$ and $R^4$ represent the carbon atoms necessary to complete a fused, 6-membered, unsaturated carbocyclic ring; and
$X^-$ represents an acid anion.

5. The method as described in claim 4 wherein the sum of n and m is not less than 1 or greater than 2.

6. A method of producing coherent laser emission in the operation of a dye laser in the wavelength range of from about 700 nm to about $1\mu$ comprising the steps of placing in an optically resonant cavity and optically pumping a dye solution to produce a population inversion in said solution with resulting stimulated emission of radiation from said solution, said solution containing between about $10^{-2}$ to about $10^{-5}$ molar concentration of a lasing dye in a non-interfering solvent, said dye having a formula as follows:

wherein:
n and m each represent an integer having a value of 0, 1 or 2 with the sum of n and m being not less than 1 nor greater than 2;
p and q each represent an integer having a value of 0 or 1;
$R^1$ and $R^2$ each represent a member selected from the group consisting of an alkyl radical having one to about 10 carbon atoms, an alkenyl radical having two to about 10 carbon atoms, a monocyclic aryl radical and an ethylene or trimethylene radical attached to the moiety Z or Z', respectively, to form a 5- or 6-membered fused heterocyclic ring;
Z and Z' each represent the non-metallic atoms necessary to complete a heterocyclic nucleus selected from the group consisting of a thiazole nucleus, a benzothiazole nucleus, a naphthathiazole nucleus, an oxazole nucleus, a benzoxazole nucleus, a naphthoxazole nucleus, a thiazoline nucleus, an imidazoquinoline nucleus, a benz(e)indole nucleus, a benzimidazole nucleus, a naphthimidazole nucleus, a 3,3-dialkylindolenine nucleus, a 2-pyridine nucleus, a 4-pyridine nucleus, and an imidazo(4,5-b)-quinoxaline nucleus;
$R^3$ and $R^4$ each represent a member selected from the group consisting of a hydrogen atom, an alkyl radical having one to about four carbon atoms, an alkoxy radical having one to about four carbon atoms, a halogen atom, and a hydroxy radical; and
$X^-$ represents an acid anion.

7. The method as described in claim 6 wherein $R^3$ and $R^4$ are hydrogen and n and m each have a value of 1.

8. The method as described in claim 6 wherein $R^1$ and $R^2$ each represent a hydrogen atom, an alkyl radical of one to about four carbon atoms or an alkoxy radical having one to about four carbon atoms.

9. The method as described in claim 6 wherein said dye is 2-[(3-ethyl-2(3H)-benzothiazolylidene)methyl]-4-[3-(3-ethyl-2(3H)-benzothiazolylidene)propenyl]-5,6-benzopyrylium iodide.

10. The method as described in claim 6 wherein said dye is 4-[3-(3-ethyl-2(3H)-benzothiazolylidene)propenyl]-2-[(3-ethyl-2(3H)-benzoxazolylidene)methyl]-5,6-benzopyrylium iodide.

* * * * *

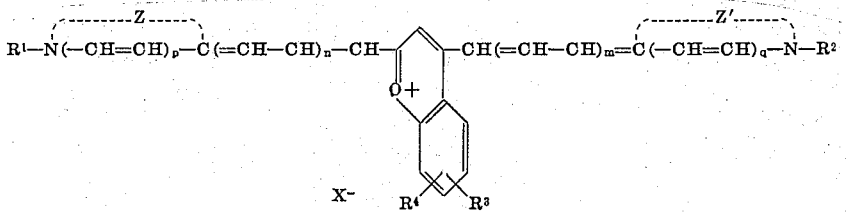

UNITED STATES PATENT AND TRADEMARK OFFICE
CERTIFICATE OF CORRECTION

PATENT NO. : U. S. patent 3,831,105
DATED : August 20, 1974
INVENTOR(S) : Frank G. Webster It is certified that error appears in the above-identified patent and that said Letters Patent are hereby corrected as shown below:

Column 3, line 40; Column 8, line 7; Column 9, lines 3 and 59: The formula should read as follows ---

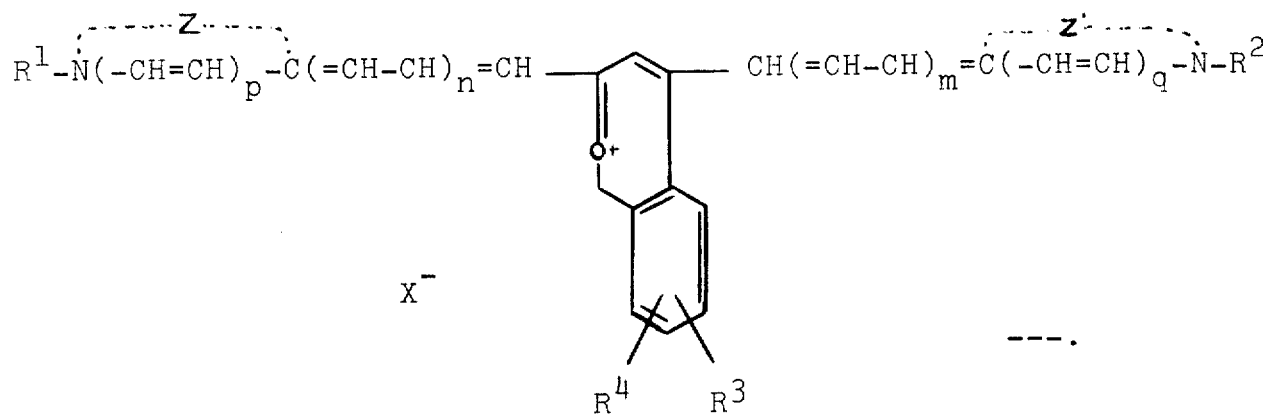

---.

Signed and sealed this 1st day of July 1975.

(SEAL)
Attest:

RUTH C. MASON
Attesting Officer

C. MARSHALL DANN
Commissioner of Patents
and Trademarks